Dec. 19, 1933.    C. A. KRUSELL    1,939,991
DIAMOND CUTTING TOOL OR THE LIKE AND METHOD OF MAKING THE SAME
Filed Dec. 17, 1931

Inventor
Carl A. Krusell
by Wright Brown Quinby May
Att'ys

Patented Dec. 19, 1933

1,939,991

UNITED STATES PATENT OFFICE 1,939,991

DIAMOND CUTTING TOOL OR THE LIKE AND METHOD OF MAKING THE SAME

Carl A. Krusell, Belmont, Mass., assignor to Hard Metal Alloys, Inc., Boston, Mass., a corporation of Massachusetts Application December 17, 1931
Serial No. 581,692

3 Claims. (Cl. 51—206)

This invention has for an object to provide a holding medium for the diamonds or other hard abrasive crystals of a diamond or similar cutting or truing tool, this medium being of sufficient hardness so that it will not wear away materially faster than the diamond itself and thus in time expose sufficient of it to permit the projecting portion to be broken off in use.

In accordance with this invention, therefore, the so-called hard metals or alloys may be used for the purpose. I prefer to use tungstic carbide although other metals such as zirconium, thorium, silicon, vanadium, tantalum, chromium, molybdenum and uranium or their mixtures or their carbides or borides or other metalloids may be treated in substantially the same manner. These hard metals or alloys fuse at temperatures above 1000° C. and are found in the fourth, fifth, and sixth groups of the periodic system. The metal or metalloid in powdered form is molded to the desired form and the diamond is embedded therein, whereupon the molded article is sintered so as to reduce it to its hard condition suitable for use.

For a more complete understanding of this invention, reference may be had to the accompanying drawing in which Figures 1 and 2 are side and end elevations, respectively, or of a detachable saw tooth carrying diamonds held in accordance with this invention.

Figure 4:
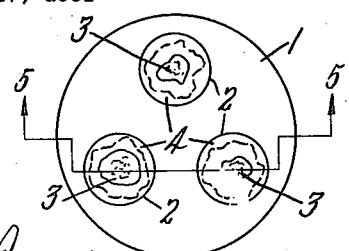
Figure 4 is an end elevation of a block of the hard material showing three diamonds held therein, this block being suitable for use as the active portion of a grinding wheel truing tool.
Figure 5:
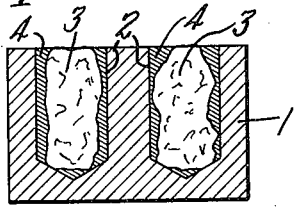
Figure 5 is a section on line 5—5 of Figure 4.
Figure 7:
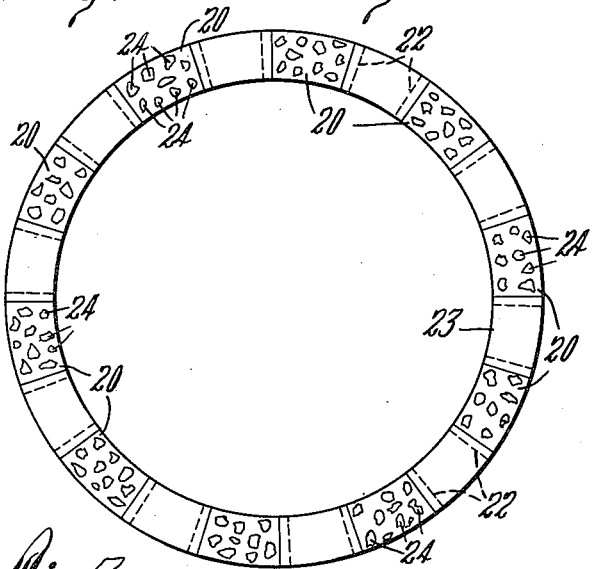
Figure 7 is an end elevation of a core drill embodying this invention.
Figure 8:
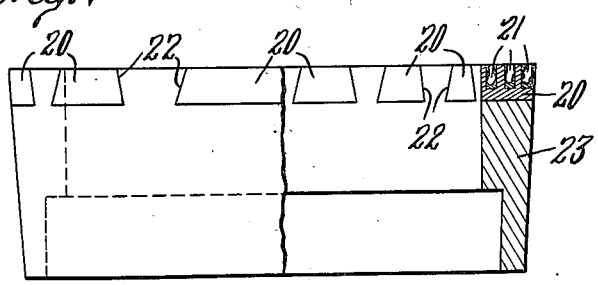
Figure 8 is a view partly in side elevation and partly in section of the same.

In accordance with the preferred method of this invention, sufficient of the metal or metalloid in powdered form, together with up to about 10% of a metal of a considerably lower melting point, such as iron, cobalt or nickel, preferably cobalt, also in powdered form, is molded under pressure such as may be produced by a hydraulic press, into a block slightly larger than is required for the finished article, as is shown, for example, in Figures 4 and 5 at 1. This pressure may vary within wide limits but a relatively high pressure such as 30 tons to the square inch is preferred since when so treated there is less shrinkage of the block during its subsequent treatment. A hole 2 for each diamond cutter 3 is then drilled into the block, the hole being of such size that the diamond can freely pass therein, or if desired, the holes can be molded in the block by providing the mold in which the powdered material is compressed with an inwardly projecting pin of suitable size for each hole. The diamond, together with sufficient of the metal or metalloid powder 4 is then packed into the hole and the block is sintered in a protective or inert atmosphere such as hydrogen, nitrogen, argon, illuminating gas, or carbon monoxide or their mixtures or embedded in carbon, graphite or the like.

The lower melting metals in the combination act somewhat as a flux to reduce the temperature necessary for sintering to take place so that proper sintering may be produced at a temperature in the neighborhood of 1800° C. which is much less than the melting points of the hard metals or metalloids. If it be attempted to introduce the diamonds into the powdered material and mold them together under pressure of three or more tons per square inch, the shrinkage during the sintering operation may cause sufficient pressure to break the diamonds. The packing of the powdered material about the diamonds in the holes of the block under much lighter pressure, however, provides sufficient cushioning effect to prevent this. If the molding pressure is materially less, it may be possible to avoid breaking the diamonds during sintering when they are molded into the mass but the over-all shrinking of the block which results produces less accuracy in the final dimensioning and shape of the block.

Figure 2:
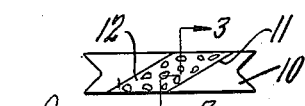
Figure 1:
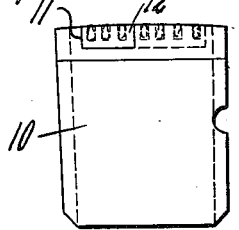
Figure 3:
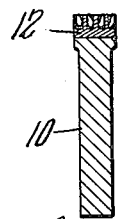
Figure 3 is a section on line 3—3 of Figure 2.

The block carrying the diamonds may be secured to suitable holders as by brazing or forming them in dovetail shape fitting dovetail grooves in their holders or in other suitable manner. For example, such a block is shown as applied to the tooth 10 of a saw in Figures 1, 2 and 3. The block 12 as shown in these figures fits in a groove 11 arranged diagonally across the outer face of the tooth and may or may not have dovetail engagement therewith.

Figure 6:
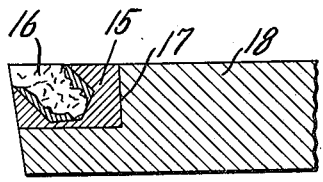
Figure 6 is a partial longitudinal section through a turning tool having a diamond cutting point.
Figure 9:
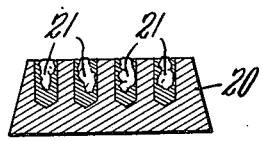
Figure 9 is an enlarged section through a block of the hard material with diamonds set therein, as used in the core drill shown in Figure 7.

In Figure 6 a turning tool is shown, the block carrying a diamond being shown at 15, the diamond itself being shown at 16. This block 15 is secured in a suitable socket 17 in the end of the tool element 18 as by brazing. In Figure 9 is shown a block 20 having a plurality of diamonds 11

21 embedded therein, this block 20 being dovetail in shape to fit in a dovetail groove 22 in the end of a core drill member 23 so as to present the cutting edges of the diamonds at 24 on the exposed annular end face of the member 23.

While this invention has been described more particularly with reference to diamonds, it is evident that it is applicable to the mounting of other very hard crystalline elements such as carborundum or the like which may be at least somewhat harder than the particular block material used.

From the foregoing description of methods which may be employed and specific examples of various tools in which the invention is embodied, it should be evident to those skilled in the art that various changes and modifications might be made and that the invention might be applicable to a great variety of tools, without departing from the spirit or scope of this invention as is defined by the appended claims.

I claim:

1. The method which comprises molding into a block under heavy pressure powdered material comprising mainly a metal of the fourth, fifth or sixth groups of the periodic system fusing at a temperature above 1000° C., forming a hole in said block, packing a diamond together with sufficient of said powdered material to fill the same under substantially lighter pressure into said hole, and then sintering to fuse the powdered material together.

2. The method which comprises molding into block form containing one or more holes therein, a powdered material comprising mainly one of the metals of the fourth, fifth or sixth groups of the periodic system fusing at a temperature above 1000° C., packing a diamond and similar powdered material under substantially lighter pressure into each of said holes, and then sintering to fuse the powdered material together about the diamond.

3. The method which comprises molding into a block under heavy pressure powdered material comprising tungstic carbide and a relatively small percentage of cobalt, drilling one or more holes in said block from one face, packing a diamond together with some of said material under substantially lighter pressure into each hole, and then sintering at a temperature of about 1800° C.

CARL A. KRUSELL.